United States Patent
Kanno

(10) Patent No.: US 8,984,456 B2
(45) Date of Patent: Mar. 17, 2015

(54) MACRO TIMING ANALYSIS DEVICE, MACRO BOUNDARY PATH TIMING ANALYSIS METHOD AND MACRO BOUNDARY PATH TIMING ANALYSIS PROGRAM

(71) Applicant: NEC Corporation, Minato-ku, Tokyo (JP)

(72) Inventor: Koji Kanno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/753,143

(22) Filed: Jan. 29, 2013

(65) Prior Publication Data
US 2013/0205271 A1   Aug. 8, 2013

(30) Foreign Application Priority Data
Feb. 2, 2012 (JP) ................. 2012-021034

(51) Int. Cl.
G06F 9/45        (2006.01)
G06F 17/50       (2006.01)

(52) U.S. Cl.
CPC ........ G06F 17/5045 (2013.01); G06F 17/5036 (2013.01); G06F 2217/62 (2013.01); G06F 2217/84 (2013.01)
USPC ........................................ 716/103

(58) Field of Classification Search
USPC ........................................ 716/103
See application file for complete search history.

(56) References Cited

U.S. PATENT DOCUMENTS

| | | | |
|---|---|---|---|
| 7,464,286 B1 * | 12/2008 | Singh et al. .................. | 713/503 |
| 2006/0020441 A1 | 1/2006 | Toyoda et al. | |
| 2006/0123368 A1 * | 6/2006 | Pineda De Gyvez et al. .... | 716/6 |
| 2011/0046937 A1 * | 2/2011 | Kanno ............................ | 703/19 |

FOREIGN PATENT DOCUMENTS

| | | |
|---|---|---|
| JP | 2000100948 A | 4/2000 |
| JP | 2000172738 A | 6/2000 |
| JP | 2000223578 A | 8/2000 |
| JP | 2000243846 A | 9/2000 |
| JP | 2000250950 A | 9/2000 |
| JP | 2000259686 A | 9/2000 |
| JP | 2000305966 A | 11/2000 |
| JP | 2001273338 A | 10/2001 |

(Continued)

OTHER PUBLICATIONS

Japanese Office Action for JP Application No. 2012-021034 mailed on Jun. 26, 2013 with Partial English Translation.

*Primary Examiner* — Jack Chiang
*Assistant Examiner* — Mohammed Alam
(74) *Attorney, Agent, or Firm* — Sughrue Mion, PLLC

(57) ABSTRACT

A macro timing analysis device comprises a netlist merging unit which merges a layout-implemented top netlist obtained by executing clock path distribution and layout processing with respect to a top netlist with a lower-order hierarchy as a macro and a layout-implemented macro netlist obtained by cutting out a circuit in the macro from the layout-implemented top netlist to generate a merging-implemented macro netlist including description of a clock path outside the macro and description of a macro boundary path which are clock paths related to the macro, and a timing analysis unit which analyzes a timing of the macro boundary path by using the merging-implemented macro netlist.

10 Claims, 14 Drawing Sheets

(56) References Cited

FOREIGN PATENT DOCUMENTS

| JP | 2003-296392 A | 10/2003 |
|---|---|---|
| JP | 2003296392 A | 10/2003 |
| JP | 2005023534 A | 1/2005 |
| JP | 2006039621 A | 2/2006 |
| JP | 2007188517 A | 7/2007 |
| JP | 2008009787 A | 1/2008 |
| JP | 2010-049386 A | 3/2010 |

* cited by examiner

MACRO TIMING ANALYSIS DEVICE, MACRO BOUNDARY PATH TIMING ANALYSIS METHOD AND MACRO BOUNDARY PATH TIMING ANALYSIS PROGRAM

TECHNICAL FIELD

The present invention relates to a macro timing analysis technique and, more particularly, a macro timing analysis device which analyzes a timing of a macro boundary path with high precision, a method of analyzing a timing of a macro boundary path and a program for analyzing a timing of a macro boundary path.

BACKGROUND ART

Increase in the size of LSI (Large Scale Integration) requires higher machine performance and larger memory necessary for the execution of EDA (Electronic Design Automation) tools, which makes processing of the entire LSI chip at once difficult. Along with the increase in the size of LSI, designing a single LSI on a basis of a part of hierarchically divided circuits (hereinafter referred to as a macro) has become main stream.

On the other hand, speed of LSI has been enhanced. For operating LSI at a high speed, in a case of a synchronization circuit, synchronous operation of flip-flops (FFs) and the like is crucial. It is accordingly essential to suppress variation (clock skews) of delay times of clock signals applied to the respective FFs.

As a method of clock distribution in hierarchical design, common is executing distribution up to one isolated terminal in each macro in top processing, executing further distribution in macro processing and merging clock distribution of the top processing and clock distribution of the macro processing at the time of chip processing as shown in FIG. 11.

This common clock distribution method has a problem that when synchronizing the entire chip, the number of stages will be increased to increase clock skews. More specifically with reference to FIG. 11, clock paths c1 and c2 will have an increased number of stages to increase clock skews because the clock paths c1 and c2 bypass a macro m1 to lead to macros m2 and m3.

The necessity has arisen in recent years for adopting such a clock distribution method as shown in FIG. 12 of executing clock distribution on the entire surface of a chip in top processing and executing macro processing by taking out, from clock paths distributed on the entire surface of the chip, a part of clock paths existing in a macro.

As related art here, Patent Literature 1 discloses the invention of merging a top netlist and a low-order hierarchy netlist (macro netlist) to generate an entire chip netlist including the entire LSI with wiring RC information of a macro boundary merged.

Patent Literature 1: Japanese Patent Laying-Open No. 2003-296392
Patent Literature 2: Japanese Patent Laying-Open No. 2001-273338
Patent Literature 3: Japanese Patent Laying-Open No. 2006-039621
Patent Literature 4: Japanese Patent Laying-Open No. 2007-188517
Patent Literature 5: Japanese Patent Laying-Open No. 2000-243846
Patent Literature 6: Japanese Patent Laying-Open No. 2000-223578
Patent Literature 7: Japanese Patent Laying-Open No. 2000-172738
Patent Literature 8: Japanese Patent Laying-Open No. 2000-100948
Patent Literature 9: Japanese Patent Laying-Open No. 2000-259686
Patent Literature 10: Japanese Patent Laying-Open No. 2000-305966
Patent Literature 11: Japanese Patent Laying-Open No. 2000-250950
Patent Literature 12: Japanese Patent Laying-Open No. 2008-9787
Patent Literature 13: Japanese Patent Laying-Open No. 2005-23534

In a case of processing a macro, the clock distribution method of executing processing by taking out, from clock paths distributed on the entire surface of a chip, a part of clock paths existing in the macro disables a circuit (including a clock path) outside a macro as shown in FIG. 13 to be recognized in a timing analysis tool, so that timing analysis of a macro boundary path (UNIT boundary path) is impossible (no macro boundary path can be analyzed before chip processing is executed).

As a result, there is a problem that in order to prevent a macro boundary path from having a timing error at the time of chip processing, macro processing needs to consider an unnecessarily large design margin. Further problem is large backtracking when a macro boundary path causes a timing error as shown in FIG. 14.

In addition, while the invention disclosed in Patent Literature 1 recites merging a top netlist and a low-order hierarchy netlist (macro netlist), it aims at generating a netlist of the entire chip including a macro boundary path, which object is different from that of the present invention. The invention disclosed in Patent Literature 1 executes only rough wiring processing with respect to a low-order hierarchy, so that it is only possible to obtain a delay value different from a real delay value.

OBJECT OF THE INVENTION

An object of the present invention is to provide a macro timing analysis device, a method of analyzing a timing of a macro boundary path and a program for analyzing a timing of a macro boundary path which solve the above-described problems and enable timing analysis of a macro boundary path with high precision in macro timing analysis.

SUMMARY

According to exemplary aspect of the invention, a macro timing analysis device comprises a netlist merging unit which merges a layout-implemented top netlist obtained by executing clock path distribution and layout processing with respect to a top netlist with a lower-order hierarchy as a macro and a layout-implemented macro netlist obtained by cutting out a circuit in the macro from the layout-implemented top netlist to generate a merging-implemented macro netlist including description of a clock path outside the macro and description of a macro boundary path which are clock paths related to the macro, and a timing analysis unit which analyzes a timing of the macro boundary path by using the merging-implemented macro netlist.

According to exemplary aspect of the invention, a method of analyzing a timing of a macro boundary path by a macro timing analysis device, wherein a netlist merging unit executes a netlist merging step of merging a layout-implemented top netlist obtained by executing clock path distribution and layout processing with respect to a top netlist with a lower-order hierarchy as a macro and a layout-implemented macro netlist obtained by cutting out a circuit in the macro from the layout-implemented top netlist to generate a merging-implemented macro netlist including description of a clock path outside the macro and description of a macro boundary path which are clock paths related to the macro, and a timing analysis unit executes a timing analysis step of analyzing a timing of the macro boundary path by using the merging-implemented macro netlist.

According to exemplary aspect of the invention, a computer-readable medium storing a program for analyzing a timing of a macro boundary path which program is operable on a computer forming a macro timing analysis device, wherein the program causes the computer to execute a netlist merging processing of merging a layout-implemented top netlist obtained by executing clock path distribution and layout processing with respect to a top netlist with a lower-order hierarchy as a macro and a layout-implemented macro netlist obtained by cutting out a circuit in the macro from the layout-implemented top netlist to generate a merging-implemented macro netlist including description of a clock path outside the macro and description of a macro boundary path which are clock paths related to the macro, and a timing analysis processing of analyzing a timing of the macro boundary path by using the merging-implemented macro netlist.

The present invention enables timing analysis of a macro boundary path in macro timing analysis, thereby reducing backtracking of design, as well as saving an excessive design margin to contribute to optimum LSI design.

Other objects, features and advantages of the present invention will become clear from the detailed description given herebelow.

EXEMPLARY EMBODIMENT

Figure 1:
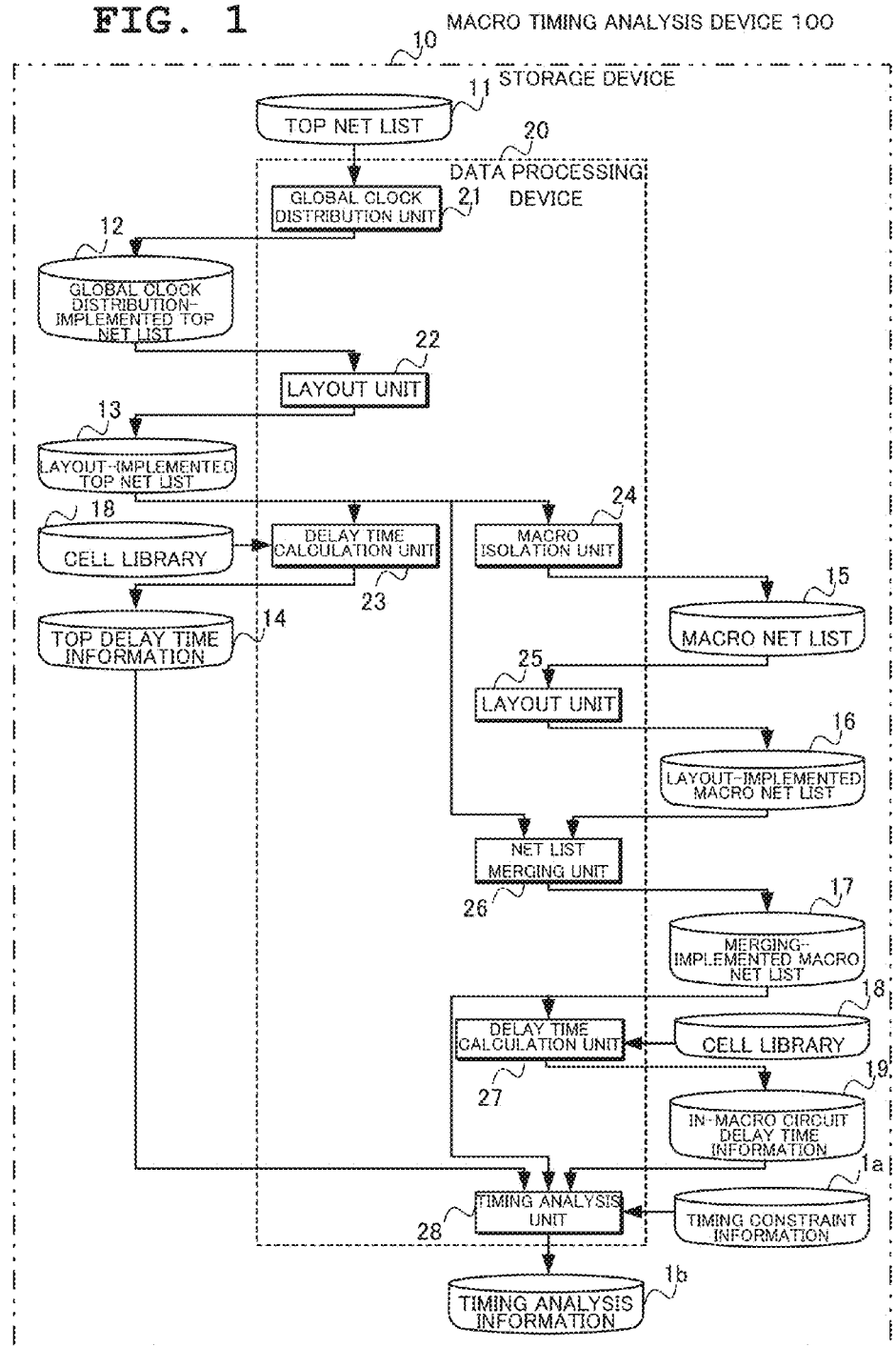
FIG. 1 is a block diagram showing a structure of a macro timing analysis device according to a first exemplary embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In order to clarify the foregoing and other objects, features and advantages of the present invention, exemplary embodiments of the present invention will be detailed in the following with reference to the accompanying drawings. Other technical problems, means for solving the technical problems and functions and effects thereof other than the above-described objects of the present invention will become more apparent from the following disclosure of an exemplary embodiment. In all the drawings, like components are identified by the same reference numerals to appropriately omit description thereof.

First Exemplary Embodiment

First exemplary embodiment of the present invention will be detailed with reference to the drawings. Clock distribution method of [H-Tree] used in the present description is one example only.

FIG. 1 is a block diagram showing a structure of a macro timing analysis device 100 according to the first exemplary embodiment of the present invention. The macro timing analysis device 100 is an execution entity of a timing analysis method of a semiconductor integrated circuit of the present invention.

With reference to FIG. 1, the macro timing analysis device 100 comprises a storage device 10 such as a hard disk and a data processing device 20 operable under program control. The storage device 10 may be provided outside the macro timing analysis device 100.

The storage device 10 has a top netlist 11, a cell library 18 and timing constraint information 1a stored in advance. The storage device 10 also includes an area for storing, as output information from the data processing device 20, a global clock distribution-implemented top netlist 12, a layout-implemented top netlist 13, top delay time information 14, a macro netlist 15, a layout-implemented macro netlist 16, a merging-implemented macro netlist 17, in-macro circuit delay time information 19 and timing analysis information 1b.

The top netlist 11 is a netlist which is output from a layout tool with a lower-order hierarchy as a macro after completion of macro, IP layout (floor plan) and primitive cell layout and is stored in advance by the storage device 10.

The cell library 18 stores in advance a delay time from an input terminal to an output terminal in each cell serving as a flip-flop (FF) or a clock driver, set-up time or hold time of a clock signal to a data signal applied to the input terminal and the like. Details of the cell library are described as a cell library in Patent Literature 2 and a timing constraint library in Patent Literature 3.

The timing constraint information 1a is information such as basic clock cycle (or basic clock frequency), an external delay time of an input pin, requested delay time outside an output pin, a timing constraint exceptional path (false path, multi-cycle path) as constraint information for operating a semiconductor integrated circuit, which is stored in advance by the storage device 10.

Figure 2:
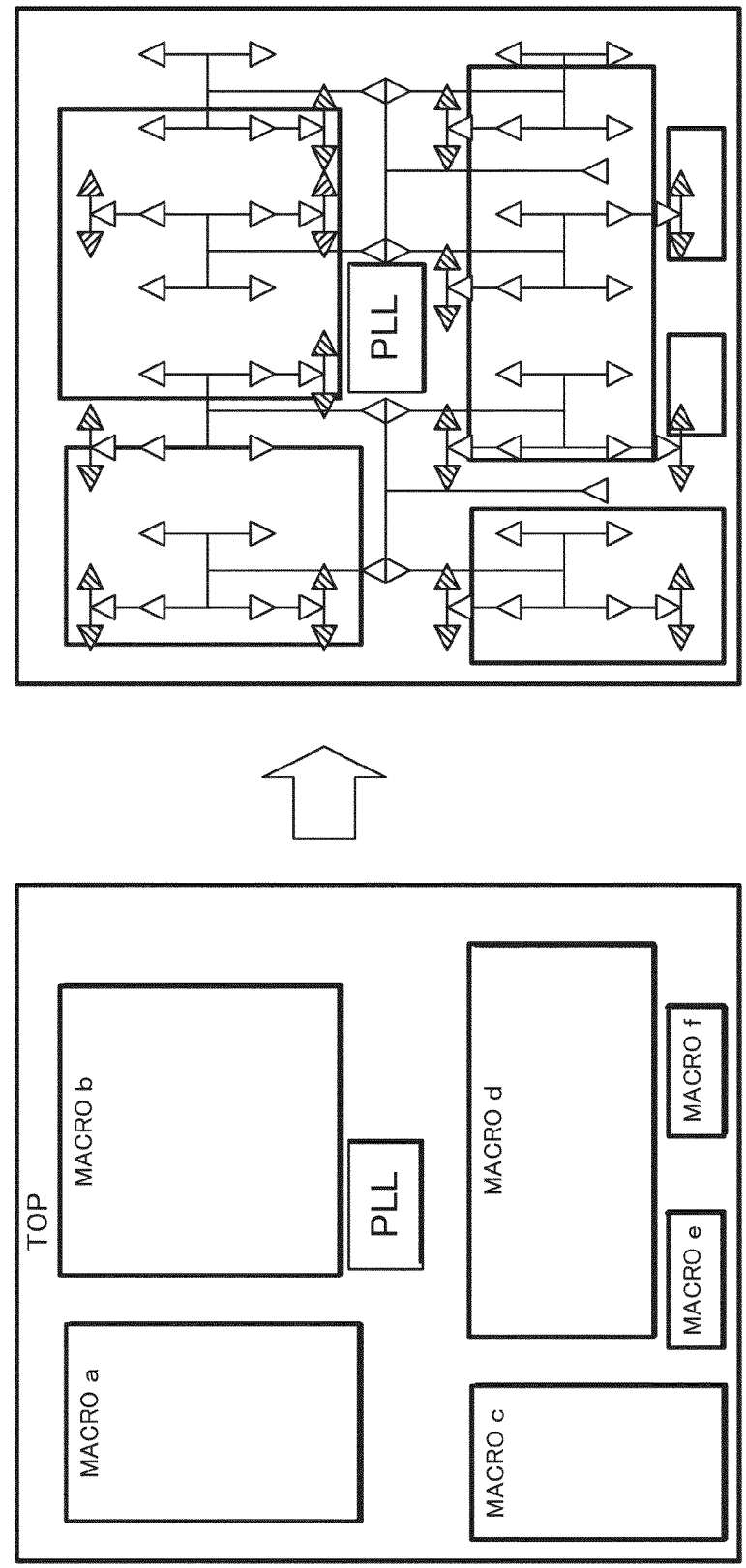
FIG. 2 is a diagram showing an example of a structure of a global clock distribution-implemented top netlist according to the first exemplary embodiment of the present invention.

Output as the global clock distribution-implemented top netlist 12 is a netlist showing that clock paths are distributed on the entire surface of a chip in the top netlist 11 (FIG. 2).

Output as the layout-implemented top netlist 13 is a netlist obtained by subjecting layout processing to the global clock distribution-implemented netlist 12.

Output as the top delay time information 14 is a wiring delay or a gate delay of each network in a top processing-implemented circuit including a global clock path.

Output as the macro netlist 15 is a netlist regarding a circuit in a macro extracted from the layout-implemented top netlist 13.

Output as the layout-implemented macro netlist 16 is a netlist obtained by subjecting layout processing to the macro netlist 15.

Output as the merging-implemented macro netlist 17 is a netlist including a clock path outside a macro and a macro boundary path obtained by merging clock path description and macro boundary path description related to a target macro which are extracted from the layout-implemented top netlist 13 with the layout-implemented macro netlist 16.

Output as the in-macro circuit delay time information 19 is a wiring delay or gate delay of each network of a circuit in a macro.

Output as the timing analysis information 1b is information about frequency distribution statistics on a timing constraint path violation or violation value basis which is obtained by checking whether a timing constraint is satisfied or not.

The data processing device 20 includes a global clock distribution unit 21, a layout unit 22, a delay time calculation unit 23, a macro isolation unit 24, a layout unit 25, a netlist merging unit 26, a delay time calculation unit 27 and a timing analysis unit 28.

The global clock distribution unit 21 receives input of the top netlist 11 to distribute clock paths on the entire surface of a chip, thereby outputting the global clock distribution-implemented top netlist 12. At this time, it is common to execute shield wiring or adjacency-inhibiting wiring such that a delay of each clock path will not largely change in a subsequent layout procedure.

The layout unit 22 receives input of the global clock distribution-implemented top netlist 12 to execute layout processing and outputs the layout-implemented top netlist 13. The layout processing includes processing of connecting a terminal driver of a clock tree as a destination of global clock distribution and FF or IP immediately subjected to the top processing.

The delay time calculation unit 23 receives input of the layout-implemented top netlist 13, refers to the cell library 18 and executes delay calculation by RC simulation to output the top delay time information 14.

The macro isolation unit 24 receives input of the layout-implemented top netlist 13 to output the macro netlist 15 with respect to an isolated circuit of a macro.

The layout unit 25 receives input of the macro netlist 15 and executes layout processing to output the layout-implemented macro netlist 16. The layout processing includes processing of connecting a terminal driver of a clock tree as a destination of global clock distribution with FF in the macro.

The netlist merging unit 26 receives input of the layout-implemented top netlist 13 and the layout-implemented macro netlist 16, extracts clock path description and macro boundary path description related to a target macro from the layout-implemented top netlist 13 and merges the extracted description with the layout-implemented macro netlist 16 to output the merging-implemented macro netlist 17.

The delay time calculation unit 27 receives input of the merging-implemented macro netlist 17, refers to the cell library 18 and executes delay calculation by RC simulation to output the in-macro circuit delay time information 19.

The timing analysis unit 28 refers to the top delay time information 14, the in-macro circuit delay time information 19 and the timing constraint information 1a to assign delay time information to the merging-implemented macro netlist 17. To a clock path outside a macro and a circuit part of a macro boundary path outside the macro, the timing analysis unit 28 assigns necessary delay time information from the top delay time information 14 and with respect to a circuit in the macro, assigns delay time information of a circuit in the macro from the in-macro circuit delay time information 19.

The timing analysis unit 28 also executes calculation of delay time of a signal path, calculation of a delay time of a clock path, and calculation of clock skew and checks whether the clock path delay time and the signal path delay time satisfy timing constraints based on these delay time information to output the timing analysis information 1b.

In the above-described clock skew calculation, highly precise clock skew without an excessive margin is calculated taking CRPR into consideration by obtaining information about a common clock path part of start and end points of each path from the merging-implemented macro netlist 17.

The above-described checking whether the clock path delay time and the signal path delay time satisfy timing constraints is executed by using the highly precise clock skew to see whether the clock path delay time and the signal path delay time satisfy timing constraints.

CRPR is described as removal of variation of a common part in Patent Literature 4.

Description of Operation of the First Exemplary Embodiment

Next, operation of the macro timing analysis device 100 according to the present exemplary embodiment will be detailed with reference to the drawings.

Figure 3:
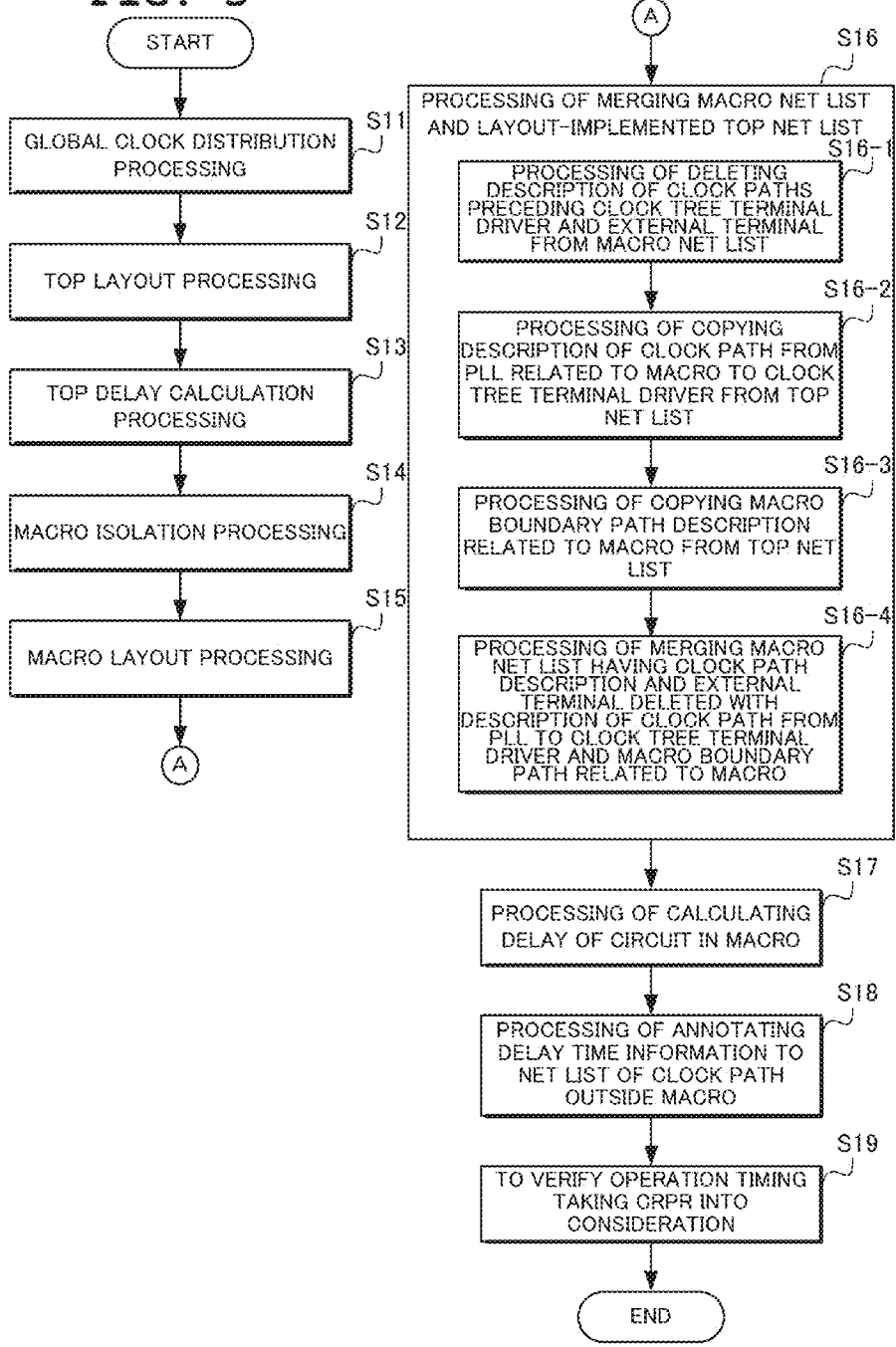
FIG. 3 is a flow chart showing operation of the macro timing analysis device according to the first exemplary embodiment of the present invention.

First, a process of timing analysis of a macro including a macro boundary path will be described divisionally from Step S11 to Step S19 in FIG. 3.

Step S11: The global clock distribution unit 21 receives input of the top netlist 11. The global clock distribution unit 21 executes not such clock distribution up to a macro boundary as is executed in common top processing but clock distribution on the entire surface of a chip including an internal area of a macro (FIG. 2) to output the global clock distribution-implemented top netlist 12.

Step S12: The layout unit 22 receives input of the global clock distribution-implemented top netlist 12. The layout unit 22 executes layout processing to output the layout-implemented top netlist 13. This processing includes processing of connecting a clock path from a terminal driver of a clock tree to a clock input terminal of each FF or IP immediately subjected to the top processing. The processing of connecting a clock path from a terminal driver of a clock tree to a clock input terminal of each FF or IP can be realized with reference to Patent Literature 5 and the like. Details of other layout processing can be realized with reference to Patent Literature 6, Patent Literature 7, Patent Literature 8 and the like.

Step S13: The delay time calculation unit 23 receives input of the layout-implemented top netlist 13. The delay time calculation unit 23 refers to the cell library 18 to execute delay calculation by RC simulation to output the top delay time information 14. Details of Step S13 including the delay time calculation unit 23 can be realized with reference to Patent Literature 9, Patent Literature 10, Patent Literature 11, Patent Literature 12 and the like.

Figure 12:
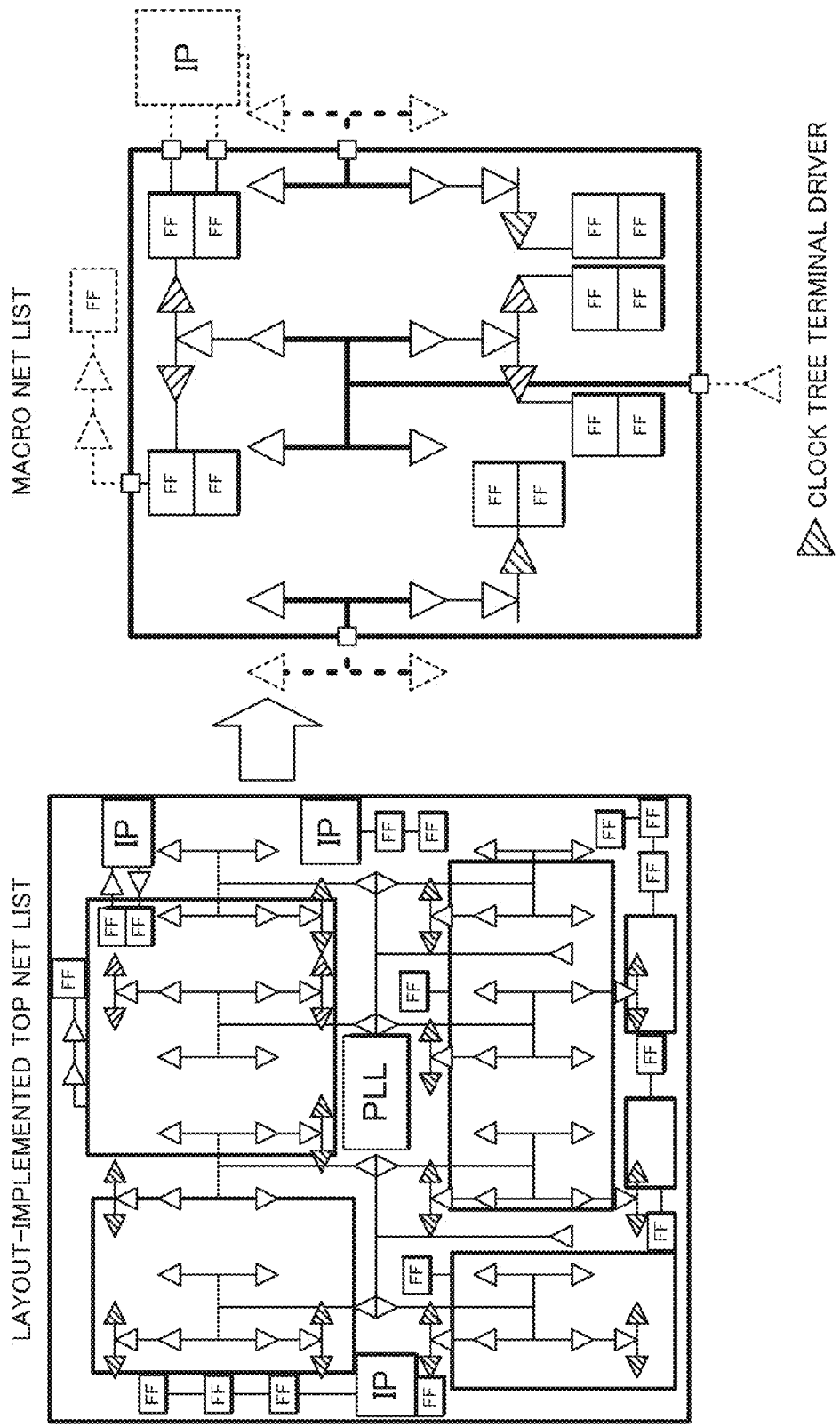
FIG. 12 is a diagram showing an example of the clock distribution method in hierarchical design according to the background art.
Figure 13:
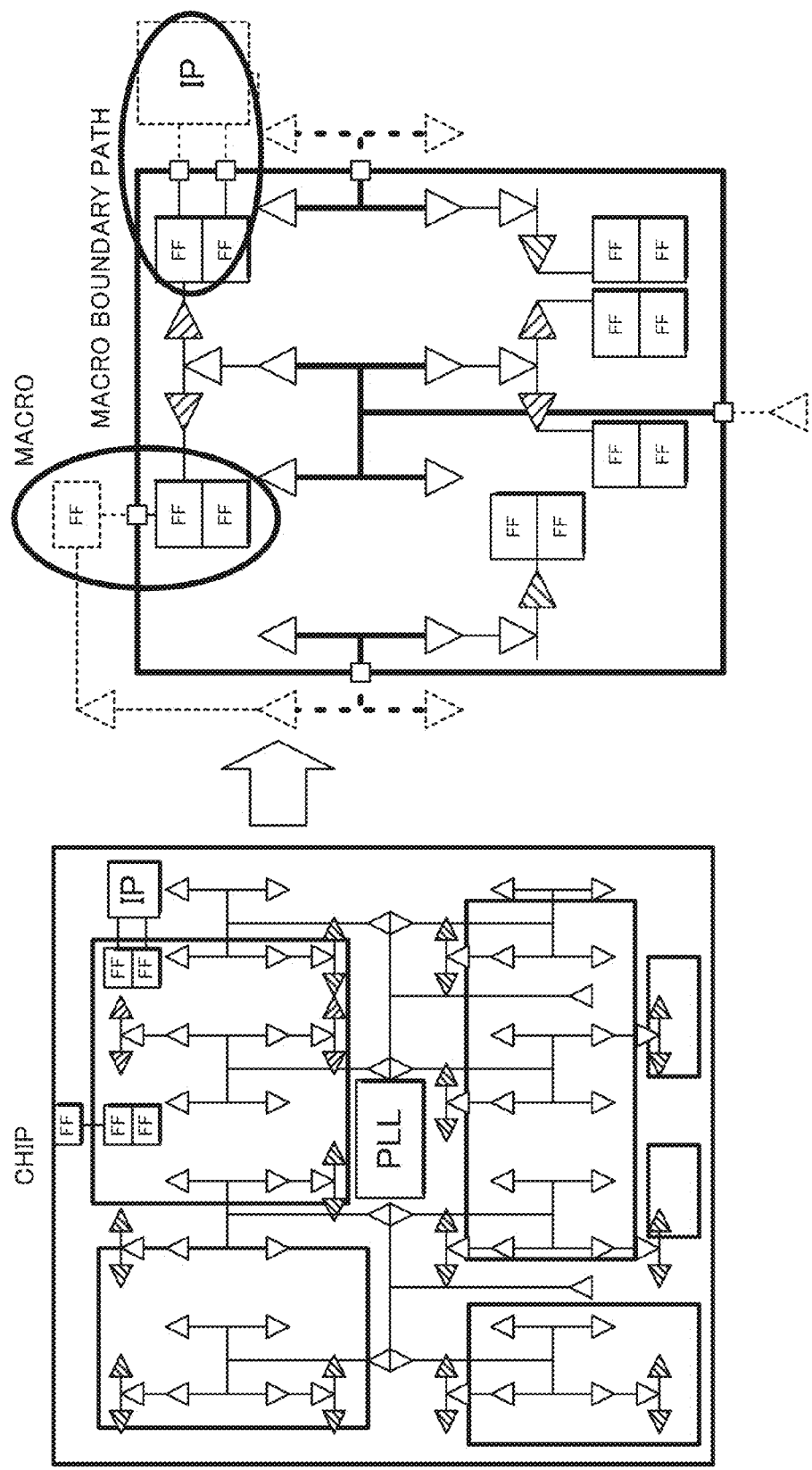
FIG. 13 is a diagram showing a problem of the clock distribution method in hierarchical design according to the background art.

Step S14: The macro isolation unit 24 receives input of the layout-implemented top netlist 13. The macro isolation unit 24 outputs the macro netlist 15 with regard to an isolated circuit in a macro (FIG. 12). Since the clock paths are physically distributed on the entire surface of a chip by clock distribution in Step S11, external clock terminals outside the macro are generated at intersecting points between the clock paths and a macro boundary, so that the macro including external clock terminals is isolated. Other processing than the clock terminal isolating processing can be realized with reference to Patent Literature 13, Patent Literature 14 and the like.

Step S15: The layout unit 25 receives input of the macro netlist 15. The layout unit 25 executes layout processing to output the layout-implemented macro netlist 16. In this processing, a clock path from a terminal driver of a clock tree to a clock input terminal of each FF in a macro is connected. This completes distribution of clock paths leading from clock sources to FFs. The processing of connecting clock paths leading from the terminal drivers of a clock tree to the clock input terminals of FFs can be realized with reference to Patent Literature 5 and the like. Details of other layout processing can be realized with reference to Patent Literature 6, Patent Literature 7, Patent Literature 8 and the like.

Step S16: The netlist merging unit 26 receives input of the layout-implemented macro netlist 16 and the layout-implemented top netlist 13 to execute netlist merging processing. With regard to Step S16, specific processing will be described divisionally from Step S16-1 to Step S16-4 with reference to FIG. 4 to FIG. 8.

Figure 4:
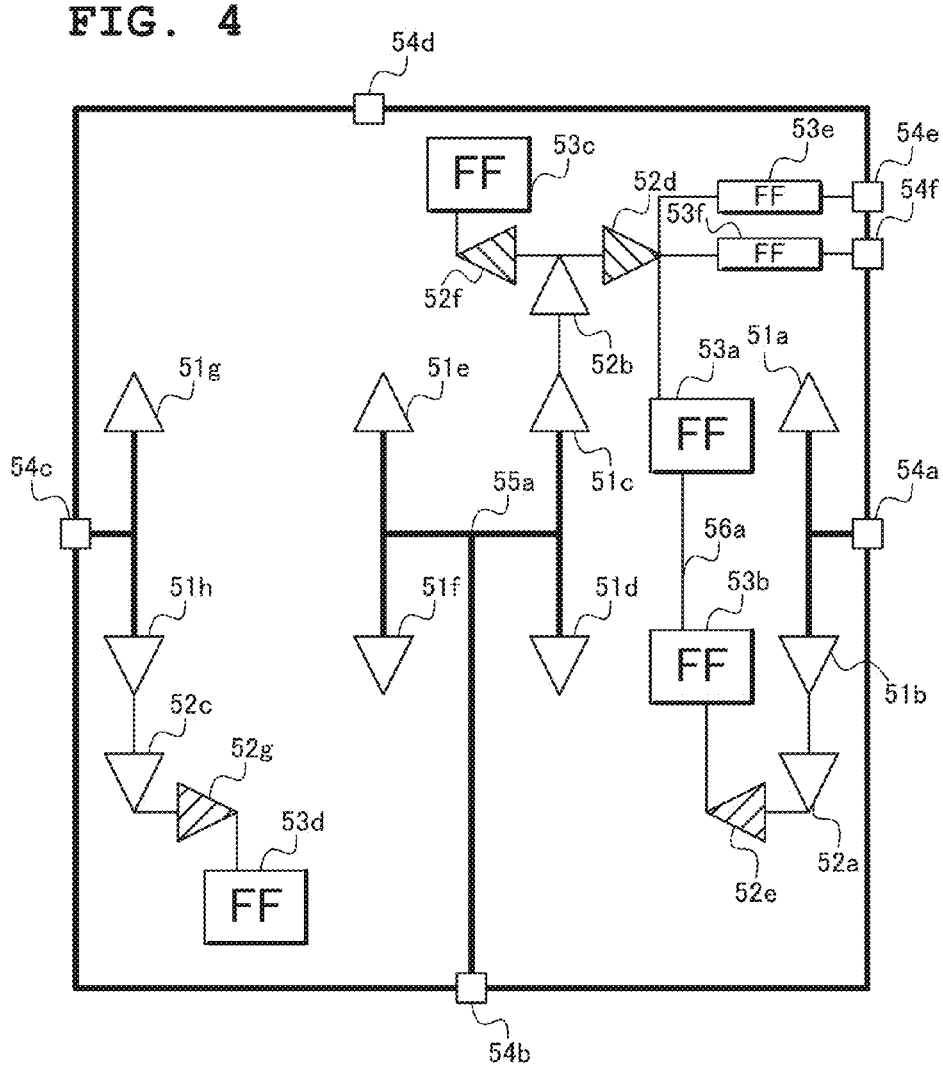
FIG. 4 is a diagram showing an example of a structure of a layout-implemented macro netlist according to the first exemplary embodiment of the present invention.
Figure 5:
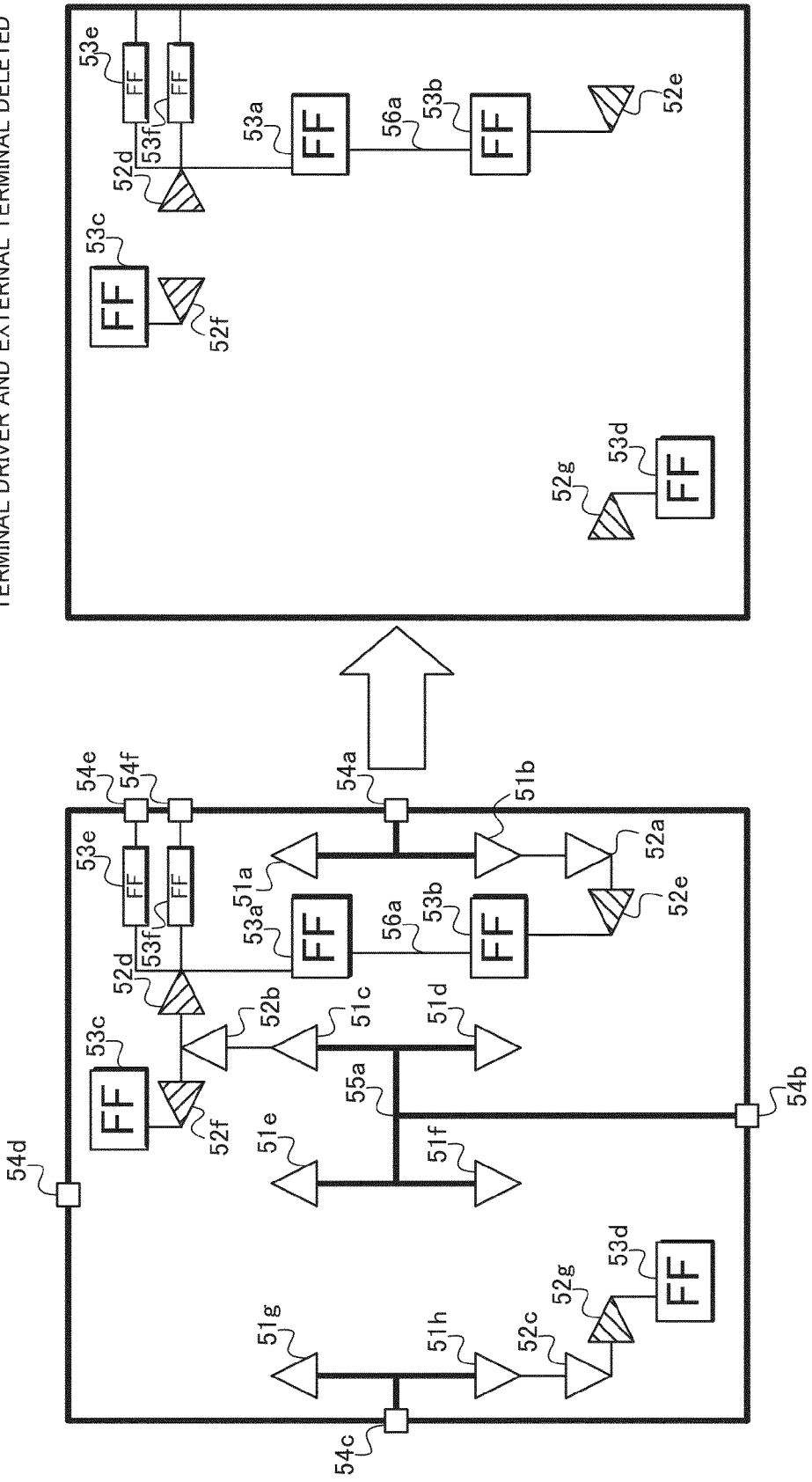
FIG. 5 is a diagram showing an example of a structure of a layout-implemented macro netlist from which description of a clock path preceding a clock tree terminal driver is deleted according to the first exemplary embodiment of the present invention.

FIG. 4 shows the layout-implemented macro netlist 16 of a timing analysis target macro b. As shown in FIG. 4, the macro b includes cells 51a to 51h, 52a to 52g and 53a to 53f, external clock terminals 54a to 54c, external terminals 54d to 54f, a clock wiring branch point 55a and a general signal wiring 56a.

The cells 51a to 51h are global clock drivers and the cells 52a to 52g are local clock drivers. The cells 53a to 53d are flip-flops (FFs). The macro b is a circuit with these elements combined as shown in FIG. 4.

Step S16-1: Delete description of a clock path preceding the terminal driver of the clock tree (cell, net, input terminal) from the layout-implemented macro netlist 16 of the macro b. More specifically, delete the cells 51a to 51h, 52a to 52c, the external clock terminals 54a to 54c, the clock net preceding the clock tree terminal drivers 52d to 52g leading to the external clock terminals, and the external terminals 54d to 54f of the macro b to have such a netlist as shown in the right figure in FIG. 5.

Figure 6:
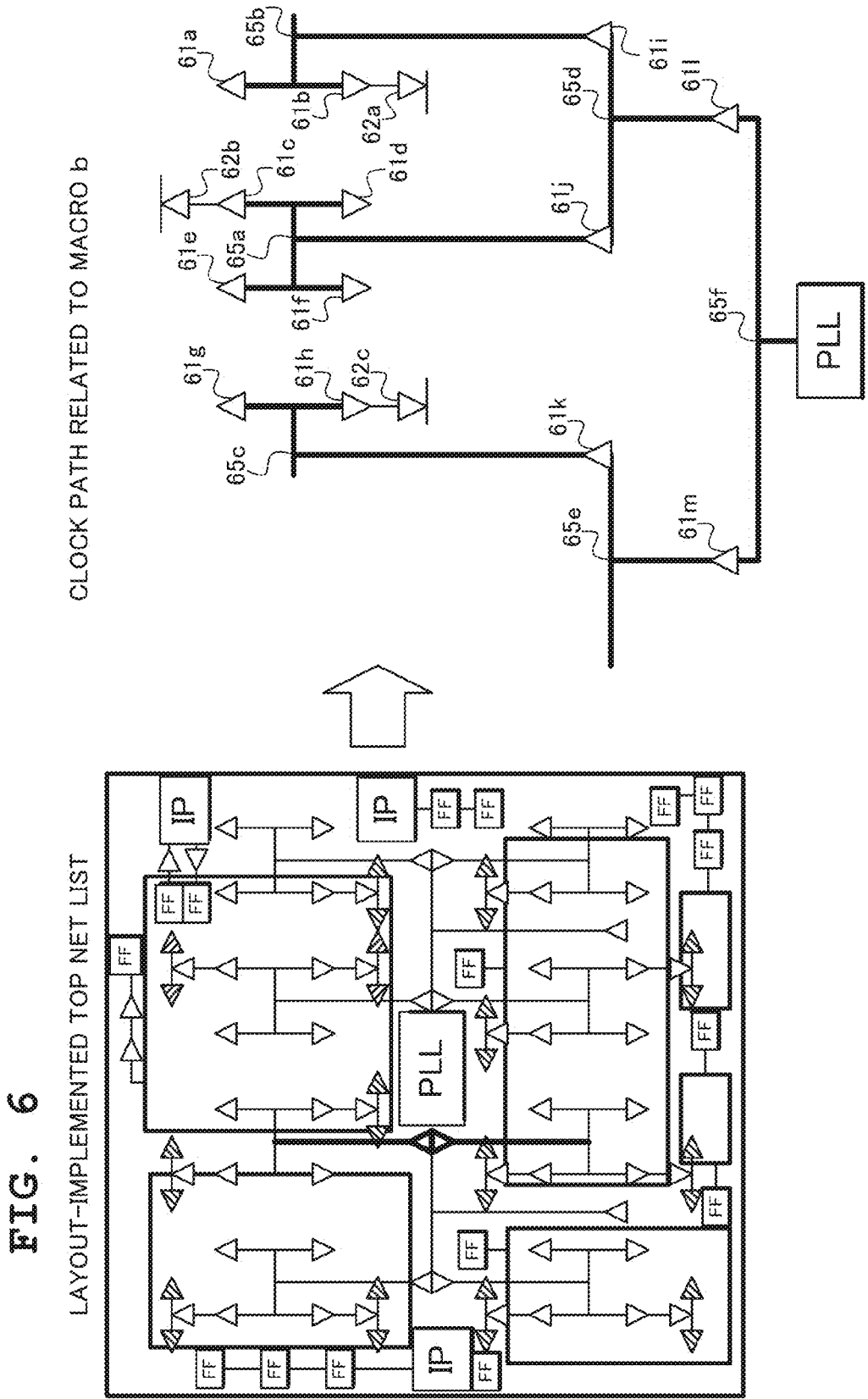
FIG. 6 is a diagram showing an example of a structure of a clock path related to a macro according to the first exemplary embodiment of the present invention.

Step S16-2: Copy description of clock paths preceding the clock tree terminal drivers from a PLL related to the macro b from the layout-implemented top netlist 13. The processing specifically includes tracing, with a name of a terminal driver of a clock tree included in the layout-implemented macro netlist 16 as a start point, the global clock distribution-implemented top netlist 12 toward PLL. From the terminal driver of the clock tree, trace its preceding input net, from the input net, trace its preceding driver, from the driver, trace its preceding input net and so on to repeat the tracing and when arriving at the PLL, fix and copy the description of the clock paths preceding the terminal driver of the clock tree from the PLL. Repeat this process as many times as the number of terminal drivers of the clock tree. Thus the clock paths related to the macro b are obtained (FIG. 6).

Figure 7:
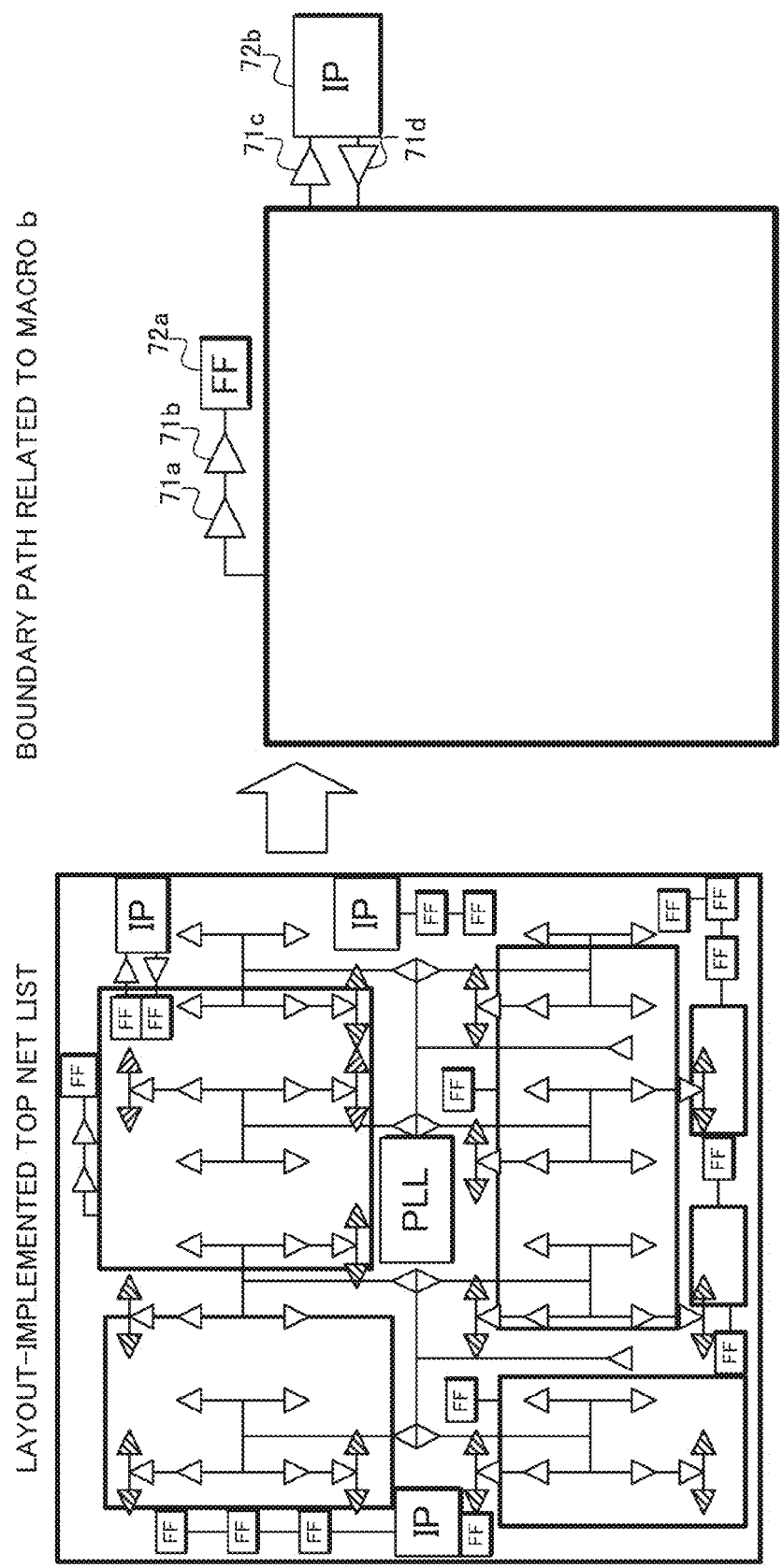
FIG. 7 is a diagram showing an example of a structure of a macro boundary path according to the first exemplary embodiment of the present invention.

Step S16-3: Copy description of a macro boundary path related to the macro b from the layout-implemented top netlist 13. The processing specifically includes tracing, with an external terminal name included in the layout-implemented macro netlist 16 as a start point, the layout-implemented top netlist 13 toward the outside of the macro. From the external terminal of the macro, trace its succeeding net, from the net, trace its succeeding cell, from the cell, trace its succeeding net and so on to repeat the tracing and when arriving at a start point (clock pin of FF or IP) or an end point (data pin of FF or IP) of a timing path, fix and copy the description of the macro boundary path from the start point/end point to the macro external terminal. Repeat this process as many times as the number of external terminals of the macro. Thus the macro boundary path related to the macro b is obtained (FIG. 7).

Figure 8:
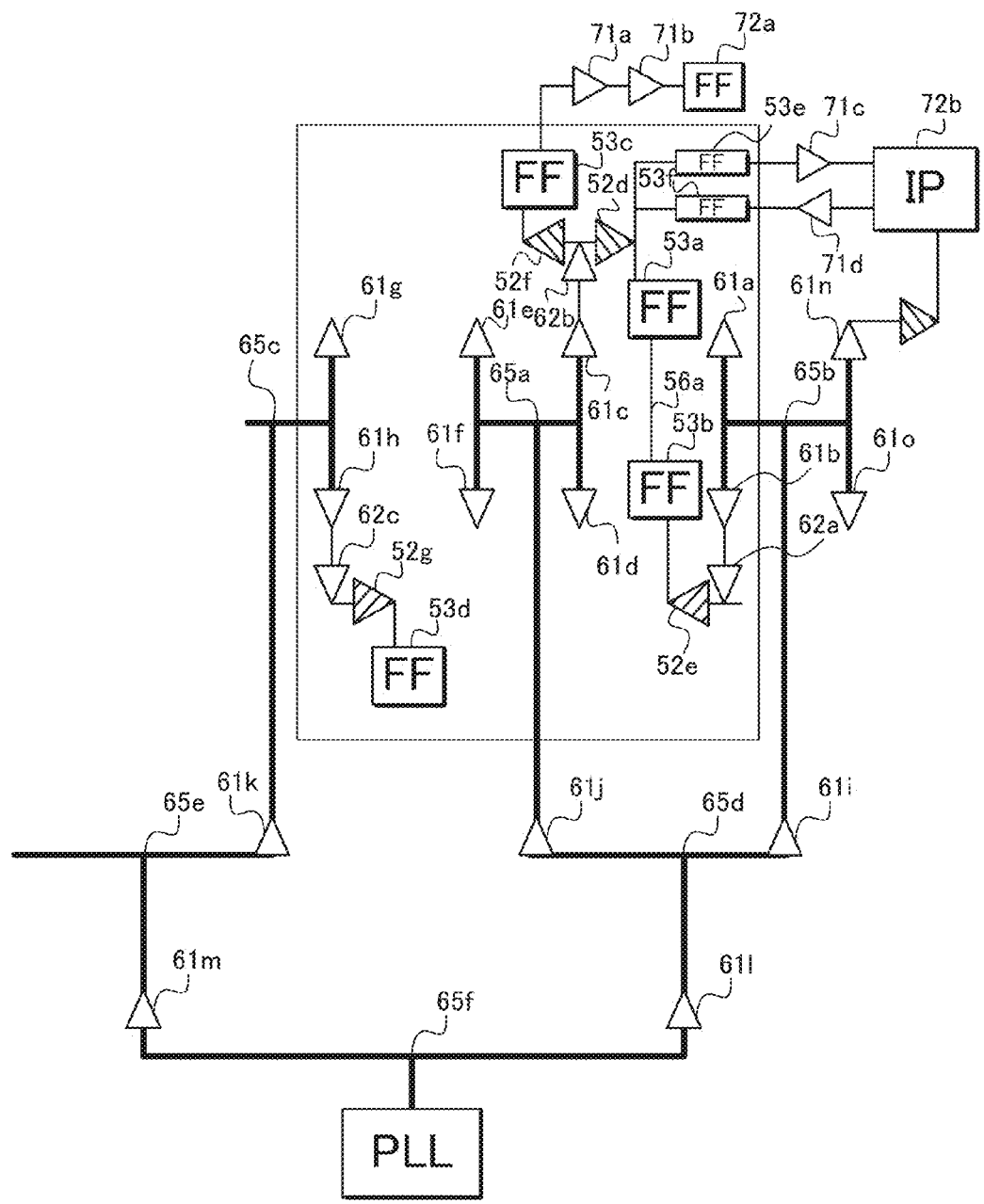
FIG. 8 is a diagram showing an example of a structure of a merging-implemented macro netlist according to the first exemplary embodiment of the present invention.

Step S16-4: Merge the netlist having the description of the clock path preceding the terminal driver of the clock tree deleted which list is generated in Step S16-1 with the description of the clock path related to the macro b which is generated in Step S16-2 and the description of the macro boundary path related to the macro b which is generated in Step S16-3 to generate the merging-implemented macro netlist 17 as shown in FIG. 8.

Step S17: The delay time calculation unit 27 receives input of the merging-implemented macro netlist 17, refers to the cell library 18 and executes delay calculation by RC simulation to output the in-macro circuit delay time information 19. Details of Step S16 including the delay time calculation unit 27 can be realized with reference to Patent Literature 2, Patent Literature 10, Patent Literature 11, Patent Literature 12, and the like.

Step S18: The timing analysis unit 28 receives inputs of the merging-implemented macro netlist 17 and the top delay time information 14. The timing analysis unit 28 assigns delay time information of a clock path outside a macro and a macro boundary path to the merging-implemented macro netlist 17. The timing analysis unit 28 further receives input of the in-macro circuit delay time information of the macro b obtained in step S17 to assign wiring delay time information or gate delay time information of each network in the macro b to the merging-implemented macro netlist 17.

Step S19: In Step S19, the timing analysis unit 28 receives input of the timing constraint information 1a to execute timing analysis including a macro boundary path based on the merging-implemented macro netlist 17 to which the delay time information is assigned which is obtained in Step S18 and the timing constraint information 1a, thereby outputting the timing analysis information 10. Using the merging-implemented macro netlist 17 with the delay time information assigned enables timing analysis of a macro boundary path. Since it is possible to recognize a clock path outside a macro, clock skew can be calculated with high precision without an excessive margin while taking CRPR into consideration, which enables timing analysis using the clock skew. Timing analysis of the macro b ends.

Effects of the First Exemplary Embodiment

Next, effects of the present invention will be described.

Figure 14:
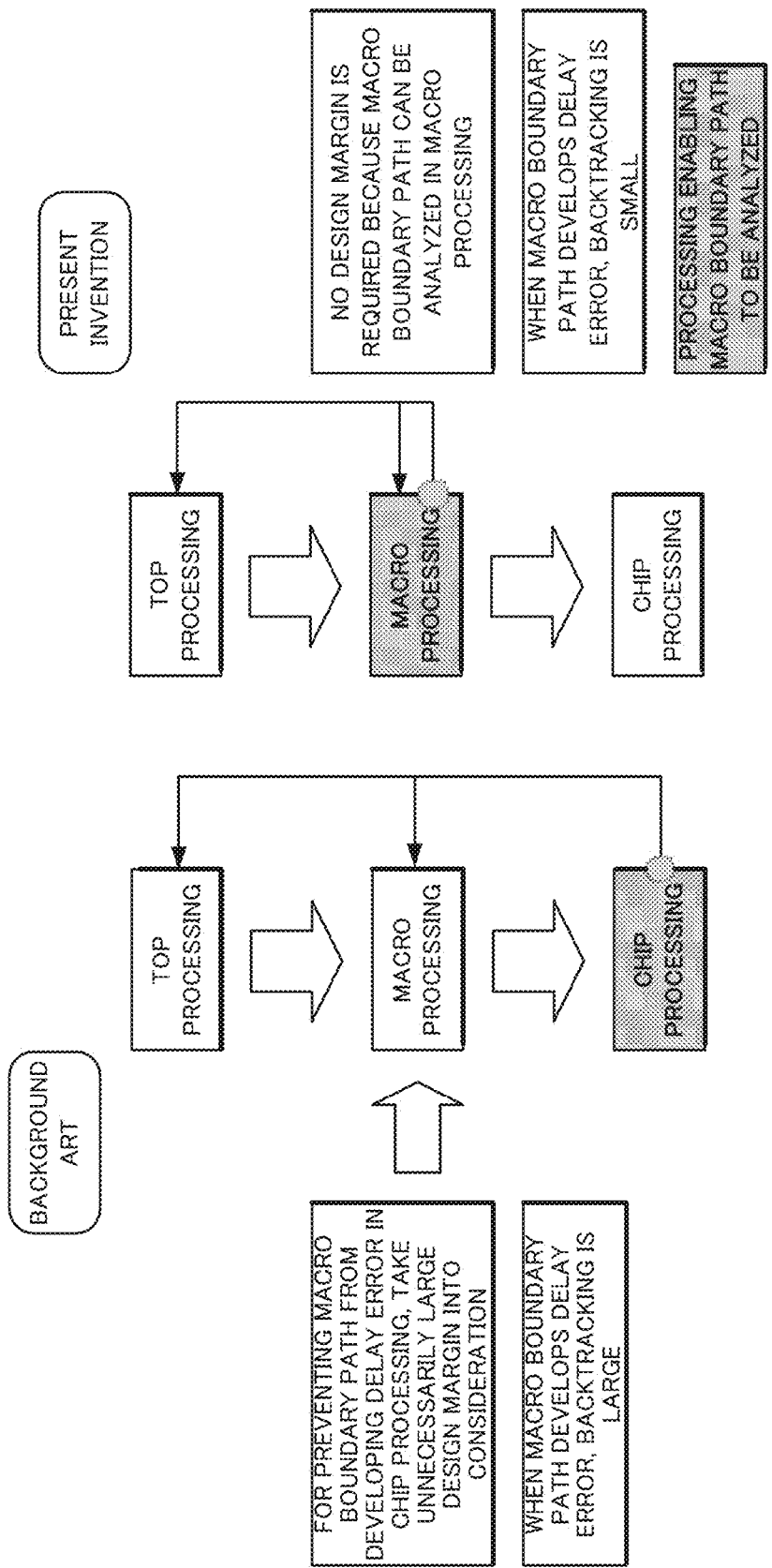
FIG. 14 is a diagram showing a problem of the clock distribution method in hierarchical design according to the background art.

With the macro timing analysis method according to the background art, a circuit of a macro outside a macro boundary (indicated by dotted lines) is not seen as shown in the right figure of FIG. 12, so that a path from FF in the macro to FF or IP outside the macro is unrecognizable to prevent timing analysis. Under these circumstances, there arises a problem that unnecessarily large design margins should be taken into consideration in macro processing in order to prevent a macro boundary path from causing a timing error at the time of chip processing as shown in the left part of FIG. 14. Another problem is large backtracking in a case of a timing error caused by a macro boundary path.

At the time of macro timing analysis, copying description of a clock path outside a macro and a macro boundary path from the layout-implemented top netlist, merging the same with a netlist used for macro timing analysis and applying the merged netlist and top delay time information to a timing analysis tool to cause the timing analysis tool to recognize the clock path outside the macro and the macro boundary path as shown in FIG. 8, thereby enabling timing analysis with highly precise clock skews without an excessive margin, of a macro boundary path which cannot be taken into consideration in the macro timing analysis according to the background art. This contributes to realization of optimum LSI design while saving a design excessive margin. It also enables a macro boundary path delay error to be found at an early stage to reduce backtracking of design, thereby shortening a time period required for designing (right side of FIG. 14).

Moreover, use of the clock distribution method of executing clock distribution on the entire surface of a chip in top processing, while realizing macro processing by cutting out a part of clock paths existing in a macro from clock paths distributed on the entire surface of the chip and involving simply connecting a terminal driver of a clock tree to FF in the macro as the clock distribution in the macro processing results in optimizing the number of stages of a clock tree of the entire chip to reduce clock skews.

Figure 9:
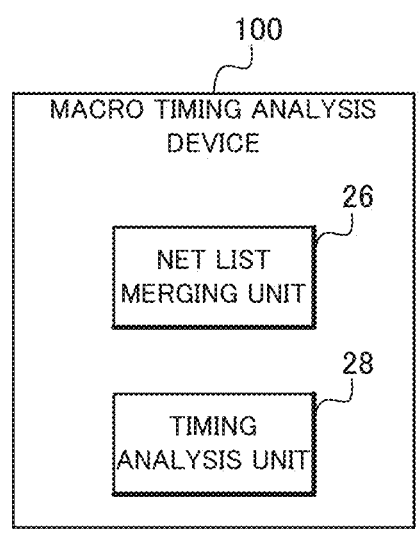
FIG. 9 is a block diagram showing a minimum structure of the macro timing analysis device of the present invention.

Minimum structure which can solve the problem of the present invention is shown in FIG. 9. The above-described problem of the present invention can be solved by providing the macro timing analysis device 100 with the netlist merging unit 26 which merges the layout-implemented top netlist 13 obtained by executing clock path distribution and layout processing with respect to the top netlist 11 with a lower-order hierarchy as a macro and the layout-implemented macro netlist 16 obtained by extracting a circuit in a macro from the layout-implemented top netlist 13 to generate the merging-implemented macro netlist 17 including description of a clock path outside the macro which is a clock path related to the macro and description of a macro boundary path, and the timing analysis unit 28 which analyzes a timing of a macro boundary path by using the merging-implemented macro netlist 17.

Figure 10:
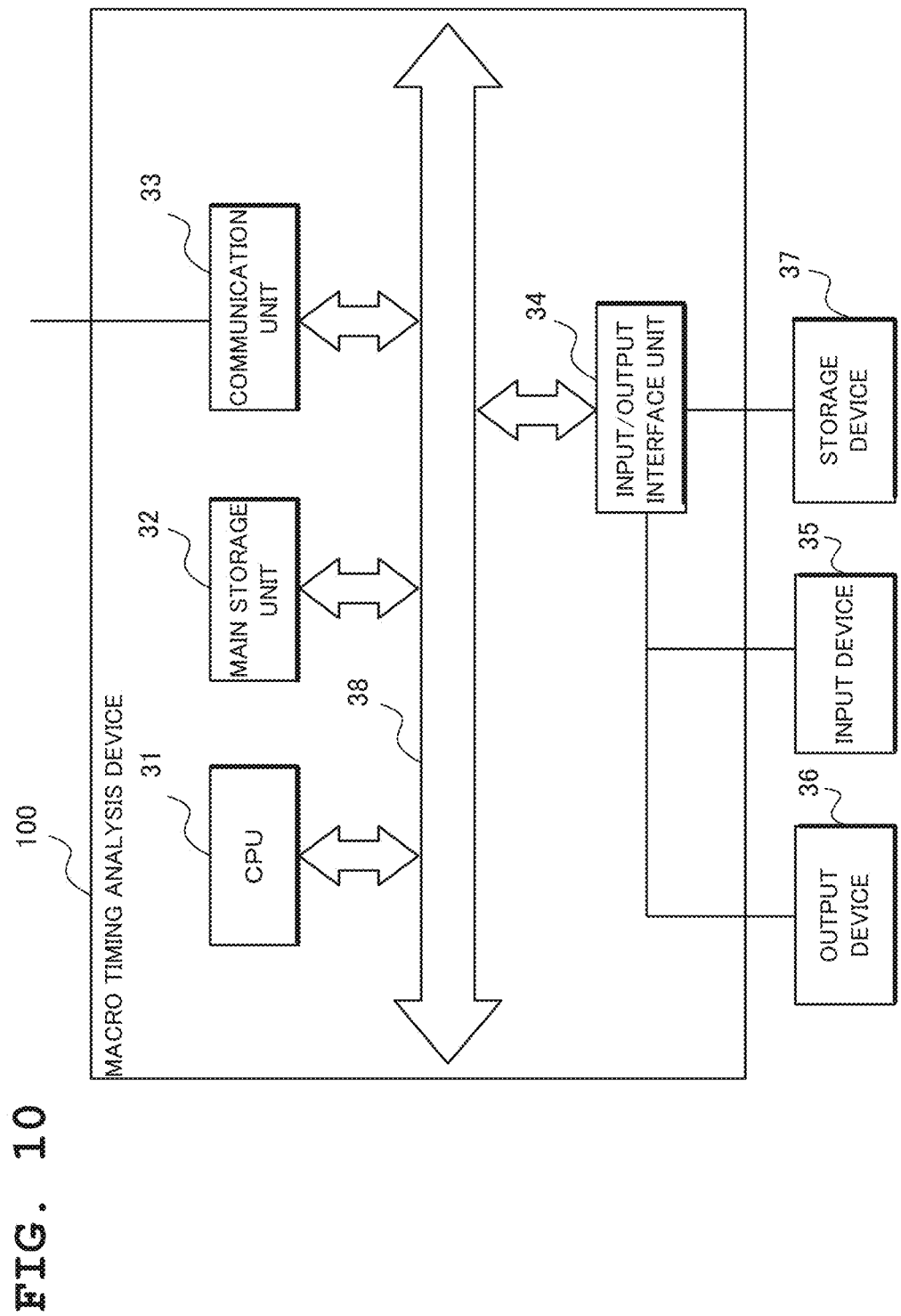
FIG. 10 is a block diagram showing an example of hardware configuration of the macro timing analysis device of the present invention.
Figure 11:
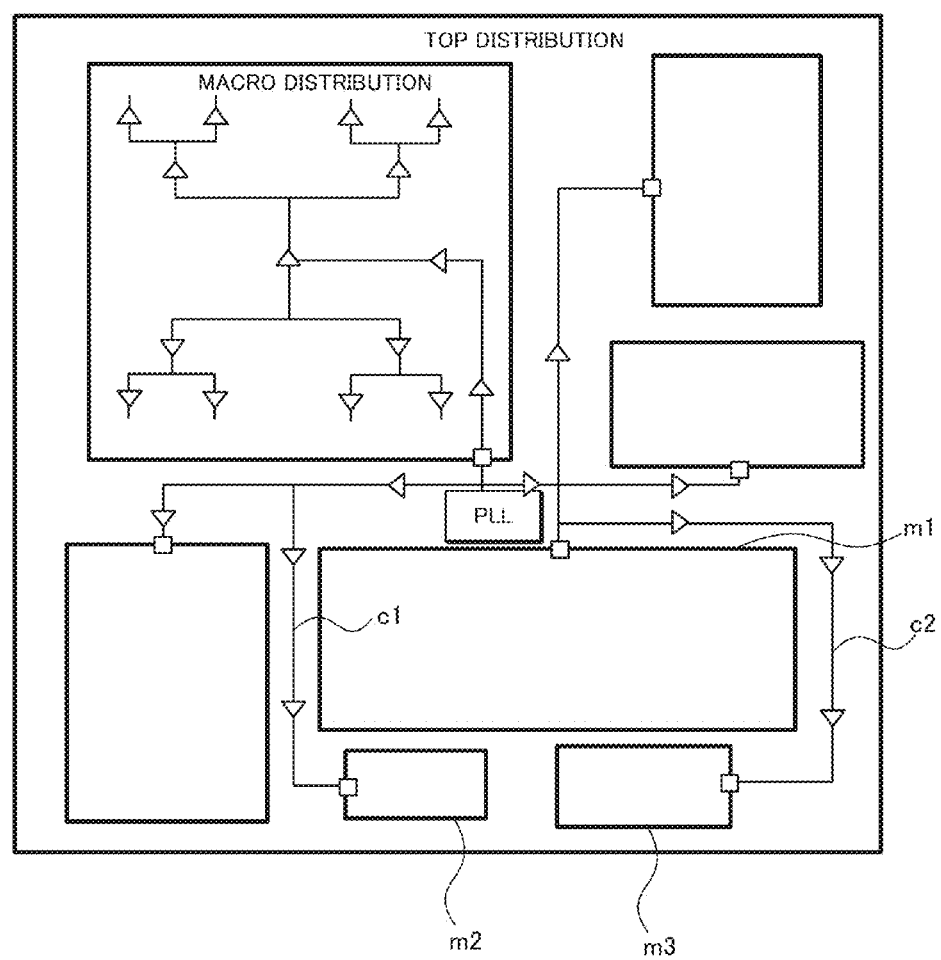
FIG. 11 is a diagram showing an example of a clock distribution method in hierarchical design according to the background art.

Next, an example of hardware configuration of the macro timing analysis device 100 of the present invention will be described with reference to FIG. 10. FIG. 10 is a block diagram showing an example of hardware configuration of the macro timing analysis device 100 of the present invention.

With reference to FIG. 10, the macro timing analysis device 100 of the present invention, which has the same hardware configuration as that of a common compute device, comprises a CPU (Central Processing Unit) 31, a main storage unit 32 formed of memory such as a RAM (Random Access Memory) for use as a data working region or a data temporary saving region, a communication unit 33 which transmits and receives data through a network, an input/output interface unit 34 connected to an input device 35, an output device 36 and a storage device 37 to transmit and receive data, and a system bus 38 which connects each of the above-described components with each other. The storage device 37 is realized by a hard disk device or the like which is formed of a non-volatile memory such as a ROM (Read Only Memory), a magnetic disk or a semiconductor memory.

Each function of the macro timing analysis device 100 of the present invention has its operation realized not only in hardware by mounting a circuit part as a hardware part such as an LSI (Large Scale Integration) with a program incorporated but also in software by storing a program which provides the functions in the storage device 37, loading the program into the main storage unit 32 and executing the same by the CPU 31.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

An arbitrary combination of the foregoing components and conversion of the expressions of the present invention to/from a method, a device, a system, a recording medium, a computer program and the like are also available as a mode of the present invention.

In addition, the various components of the present invention need not always be independent from each other, and a plurality of components may be formed as one member, or one component may be formed by a plurality of members, or a certain component may be a part of other component, or a part of a certain component and a part of other component may overlap with each other, or the like.

While the method and the computer program of the present invention have a plurality of procedures recited in order, the order of recitation is not a limitation to the order of execution of the plurality of procedures. When executing the method and the computer program of the present invention, therefore, the order of execution of the plurality of procedures can be changed without hindering the contents.

Moreover, execution of the plurality of procedures of the method and the computer program of the present invention are not limitedly executed at timing different from each other. Therefore, during the execution of a certain procedure, other procedure may occur, or a part or all of execution timing of a certain procedure and execution timing of other procedure may overlap with each other, or the like.

Furthermore, a part or all of the above-described exemplary embodiments can be recited as the following claims but are not to be construed limitative.

The whole or part of the exemplary embodiments disclosed above can be described as, but not limited to, the following supplementary notes.

(Supplementary note 1.) A macro timing analysis device comprising:

a netlist merging unit which merges a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which are clock paths related to said macro, and a timing analysis unit which analyzes a timing of said macro boundary path by using said merging-implemented macro netlist.

(Supplementary note 2.) The macro timing analysis device according to supplementary note 1, wherein said netlist merging unit extracts description of a clock path outside a macro and description of a macro boundary path which are clock paths related to said macro from said layout-implemented top netlist and traces the extracted descriptions onto said layout-implemented macro netlist to generate said merging-implemented macro netlist.

(Supplementary note 3.) The macro timing analysis device according to supplementary note 1 or supplementary note 2, wherein said netlist merging unit deletes description of a clock path preceding a terminal driver of a clock tree from said layout-implemented macro netlist, extracts description of a clock path preceding the terminal driver of the clock tree from a PLL which path is related to said macro from said layout-implemented top netlist to trace the extracted description onto said layout-implemented macro netlist, and extracts description of said macro boundary path related to said macro from said layout-implemented top netlist to trace the extracted description onto said layout-implemented macro netlist, thereby generating said merging-implemented macro netlist.

(Supplementary note 4.) The macro timing analysis device according to any one of supplementary note 1 through supplementary note 3, wherein said timing analysis unit assigns delay time information of said clock path outside the macro and said macro boundary path included in delay time information of a top processing-implemented circuit including a global clock path, and delay time information of a circuit in the macro to said merging-implemented macro netlist, and executes timing analysis of said macro boundary path based on said merging-implemented macro netlist to which said delay time information is assigned and timing constraint information which is constraint information for operating a semiconductor integrated circuit.

(Supplementary note 5.) The macro timing analysis device according to supplementary note 4, comprising a delay time calculation unit which refers to a cell library and executes delay calculation by RC simulation with respect to said merging-implemented macro netlist to generate said delay time information of the circuit in the macro.

(Supplementary note 6.) The macro timing analysis device according to any one of supplementary note 1 through supplementary note 5, wherein said timing analysis unit executes at least one of:

calculation of a delay time of a signal path,
calculation of a delay time of a clock path,
calculation of clock skew taking CRPR into consideration, and
checking whether the clock path delay time and the signal path delay time satisfy timing constraints.

(Supplementary note 7.) The macro timing analysis device according to supplementary note 6, wherein said clock skew calculation taking CRPR into consideration includes calculation of highly precise clock skew without an excessive margin taking CRPR into consideration by obtaining information about a common clock path part of start and end points of each path from said merging-implemented macro netlist.

(Supplementary note 8.) The macro timing analysis device according to supplementary note 6 or supplementary note 7, wherein said checking whether the clock path delay time and the signal path delay time satisfy the timing constraints is executed by using said clock skew taking CRPR into consideration.

(Supplementary note 9.) The macro timing analysis device according to any one of supplementary note 1 through supplementary note 8, comprising:

a macro isolation unit which generates an external clock terminal of a macro at an intersecting point between a clock path and a macro boundary of said layout-implemented top netlist to isolate a macro including the external clock terminal of the macro as said macro netlist, and a layout unit which executes layout processing with respect to said macro netlist to generate said layout-implemented macro netlist.

(Supplementary note 10.) A method of analyzing a timing of a macro boundary path by a macro timing analysis device, wherein a netlist merging unit executes a netlist merging step of merging a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which are clock paths related to said macro, and a timing analysis unit executes a timing analysis step of analyzing a timing of said macro boundary path by using said merging-implemented macro netlist.

(Supplementary note 11.) The macro boundary path timing analysis method according to supplementary note 10, wherein said netlist merging step includes extracting description of a clock path outside a macro and description of a macro boundary path which are clock paths related to said macro from said layout-implemented top netlist and tracing the extracted descriptions onto said layout-implemented macro netlist to generate said merging-implemented macro netlist.

(Supplementary note 12.) The macro boundary path timing analysis method according to supplementary note 10 or supplementary note 11, wherein said netlist merging step includes deleting description of a clock path preceding a terminal driver of a clock tree from said layout-implemented macro netlist, extracting description of a clock path preceding the terminal driver of the clock tree from a PLL which path is related to said macro from said layout-implemented top netlist to trace the extracted description onto said layout-implemented macro netlist, and extracting description of said macro boundary path related to said macro from said layout-implemented top netlist to trace the extracted description onto said layout-implemented macro netlist, thereby generating said merging-implemented macro netlist.

(Supplementary note 13.) The macro boundary path timing analysis method according to any one of supplementary note 10 through supplementary note 12, wherein said timing analysis step includes assigning delay time information of said clock path outside the macro and said macro boundary path included in delay time information of a top processing-implemented circuit including a global clock path, and delay time information of a circuit in the macro to said merging-implemented macro netlist, and executing timing analysis of said macro boundary path based on said merging-implemented macro netlist to which said delay time information is assigned and timing constraint information which is constraint information for operating a semiconductor integrated circuit.

(Supplementary note 14.) The macro boundary path timing analysis method according to supplementary note 13, wherein a delay time calculation unit executes the delay time calculation step of referring to a cell library and executing delay calculation by RC simulation with respect to said merging-implemented macro netlist to generate said delay time information of the circuit in the macro.

(Supplementary note 15.) The macro boundary path timing analysis method according to any one of supplementary note 10 through supplementary note 14, wherein said timing analysis step includes at least one of:

calculation of a delay time of a signal path, calculation of a delay time of a clock path, calculation of clock skew taking CRPR into consideration, and checking whether the clock path delay time and the signal path delay time satisfy timing constraints.

(Supplementary note 16.) The macro boundary path timing analysis method according to supplementary note 15, wherein said clock skew calculation taking CRPR into consideration includes calculation of highly precise clock skew without an excessive margin taking CRPR into consideration by obtaining information about a common clock path part of start and end points of each path from said merging-implemented macro netlist.

(Supplementary note 17.) The macro boundary path timing analysis method a according to supplementary note 15 or supplementary note 16, wherein said checking whether the clock path delay time and the signal path delay time satisfy the timing constraints is executed by using said clock skew taking CRPR into consideration.

(Supplementary note 18.) The macro boundary path timing analysis method according to any one of supplementary note 10 through supplementary note 17, wherein a macro isolation unit executes the macro isolation step of generating an external clock terminal of a macro at an intersecting point between a clock path and a macro boundary of said layout-implemented top netlist to isolate a macro including the external clock terminal of the macro as said macro netlist, and a layout unit executes the layout step of executing layout processing with respect to said macro netlist to generate said layout-implemented macro netlist.

(Supplementary note 19.) A program for analyzing a timing of a macro boundary path which program is operable on a computer forming a macro timing analysis device, which causes the computer to execute a netlist merging processing of merging a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which are clock paths related to said macro, and a timing analysis processing of analyzing a timing of said macro boundary path by using said merging-implemented macro netlist.

(Supplementary note 20.) The macro boundary path timing analysis program according to supplementary note 19, wherein said netlist merging processing includes extracting description of a clock path outside a macro and description of a macro boundary path which are clock paths related to said macro from said layout-implemented top netlist and tracing the extracted descriptions onto said layout-implemented macro netlist to generate said merging-implemented macro netlist.

(Supplementary note 21.) The macro boundary path timing analysis program according to supplementary note 19 or supplementary note 20, wherein said netlist merging processing includes deleting description of a clock path preceding a terminal driver of a clock tree from said layout-implemented macro netlist, extracting description of a clock path preceding the terminal driver of the clock tree from a PLL which path is related to said macro from said layout-implemented top netlist to trace the extracted description onto said layout-implemented macro netlist, and extracting description of said macro boundary path related to said macro from said layout-implemented top netlist to trace the extracted description onto said layout-implemented macro netlist, thereby generating said merging-implemented macro netlist.

(Supplementary note 22.) The macro boundary path timing analysis program according to any one of supplementary note 19 through supplementary note 21, wherein said timing analysis processing includes assigning delay time information of said clock path outside the macro and said macro boundary path included in delay time information of a top processing-implemented circuit including a global clock path, and delay time information of a circuit in the macro to said merging-implemented macro netlist, and executing timing analysis of said macro boundary path based on said merging-implemented macro netlist to which said delay time information is assigned and timing constraint information which is constraint information for operating a semiconductor integrated circuit.

(Supplementary note 23.) The macro boundary path timing analysis program according to supplementary note 22, which cause a delay time calculation unit to execute delay time calculation processing of referring to a cell library and executing delay calculation by RC simulation with respect to said merging-implemented macro netlist to generate said delay time information of the circuit in the macro.

(Supplementary note 24.) The macro boundary path timing analysis program according to any one of supplementary note 19 through supplementary note 23, wherein said timing analysis processing includes at least one of:

calculation of a delay time of a signal path, calculation of a delay time of a clock path, calculation of clock skew taking CRPR into consideration, and checking whether the clock path delay time and the signal path delay time satisfy timing constraints.

(Supplementary note 25.) The macro boundary path timing analysis program according to supplementary note 24, wherein said clock skew calculation taking CRPR into consideration includes calculation of highly precise clock skew without an excessive margin taking CRPR into consideration by obtaining information about a common clock path part of start and end points of each path from said merging-implemented macro netlist.

(Supplementary note 26.) The macro boundary path timing analysis program a according to supplementary note 24 or supplementary note 25, wherein said checking whether the clock path delay time and the signal path delay time satisfy the timing constraints is executed by using said clock skew taking CRPR into consideration.

(Supplementary note 27.) The macro boundary path timing analysis program according to any one of supplementary note 19 through supplementary note 26, which causes a macro isolation unit to execute the macro isolation processing of generating an external clock terminal of a macro at an intersecting point between a clock path and a macro boundary of said layout-implemented top netlist to isolate a macro including the external clock terminal of the macro as said macro netlist, and a layout unit to execute the layout processing of executing layout processing with respect to said macro netlist to generate said layout-implemented macro netlist.

INCORPORATION BY REFERENCE

This application is based upon and claims the benefit of priority from Japanese patent application No. 2012-021034, filed on Feb. 2, 2012, the disclosure of which is incorporated herein in its entirety by reference.

What is claimed is:

1. A macro timing analysis device comprising:
a netlist merging unit which merges a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which includes a tracing, with an external terminal name included in the layout-implemented macro netlist as a starting point, the layout-implemented top netlist towards outside of the macro are clock paths related to said macro; and
a timing analysis unit which analyzes a timing of said macro boundary path by using said merging-implemented macro netlist.

2. A macro timing analysis device comprising:
a netlist merging unit which merges a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which are clock paths related to said macro; and
a timing analysis unit which analyzes a timing of said macro boundary path by using said merging-implemented macro netlist,
wherein said netlist merging unit extracts description of a clock path outside a macro and description of a macro boundary path which includes a tracing, with an external terminal name included in the layout-implemented macro netlist as a starting point, the layout-implemented top netlist towards outside of the macro are clock paths related to said macro from said layout-implemented top netlist and traces the extracted descriptions onto said layout-implemented macro netlist to generate said merging-implemented macro netlist.

3. The macro timing analysis device according to claim 1, wherein said netlist merging unit
deletes description of a clock path preceding a terminal driver of a clock tree from said layout-implemented macro netlist,
extracts description of a clock path preceding the terminal driver of the clock tree from a PLL which path is related to said macro from said layout-implemented top netlist to trace the
extracted description onto said layout-implemented macro netlist, and extracts description of said macro boundary path related to said macro from said layout-implemented top netlist to trace the extracted description onto said layout-implemented macro netlist, thereby generating said merging-implemented macro netlist.

4. The macro timing analysis device according to claim 1, wherein said timing analysis unit assigns delay time information of said clock path outside the macro and said macro boundary path included in delay time information of a top processing-implemented circuit including a global clock path, and delay time information of a circuit in the macro to said merging-implemented macro netlist, and
executes timing analysis of said macro boundary path based on said merging-implemented macro netlist to which said delay time information is assigned and timing constraint information which is constraint information for operating a semiconductor integrated circuit.

5. The macro timing analysis device according to claim 4, comprising a delay time calculation unit which refers to a cell library and executes delay calculation by RC simulation with respect to said merging-implemented macro netlist to generate said delay time information of the circuit in the macro.

6. The macro timing analysis device according to claim 1, wherein said timing analysis unit executes at least one of:
calculation of a delay time of a signal path,
calculation of a delay time of a clock path,
calculation of clock skew taking CRPR into consideration, and
checking whether the clock path delay time and the signal path delay time satisfy timing constraints.

7. The macro timing analysis device according to claim 6, wherein said clock skew calculation taking CRPR into consideration includes calculation of highly precise clock skew without an excessive margin taking CRPR into consideration by obtaining information about a common clock path part of start and end points of each path from said merging-implemented macro netlist.

8. The macro timing analysis device according to claim 1, comprising:
a macro isolation unit which generates an external clock terminal of a macro at an intersecting point between a clock path and a macro boundary of said layout-implemented top netlist to isolate a macro including the external clock terminal of the macro as said macro netlist, and
a layout unit which executes layout processing with respect to said macro netlist to generate said layout-implemented macro netlist.

9. A method of analyzing a timing of a macro boundary path by a macro timing analysis device, comprising:
executing, by a netlist merging unit of a computer, a netlist merging step of merging a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which includes a tracing, with an external terminal name included in the layout-implemented macro netlist as a starting point, the layout-implemented top netlist towards outside of the macro are clock paths related to said macro, and executing, by a timing analysis unit of the computer, a timing analysis step of analyzing a timing of said macro boundary path by using said merging-implemented macro netlist.

10. A non-transitory computer-readable medium storing a program for analyzing a timing of a macro boundary path which program is operable on a computer forming a macro timing analysis device, wherein said program causes said computer to execute a netlist merging processing of merging a layout-implemented top netlist obtained by executing clock path distribution and layout processing with respect to a top netlist with a lower-order hierarchy as a macro and a layout-implemented macro netlist obtained by cutting out a circuit in the macro from said layout-implemented top netlist to generate a merging-implemented macro netlist including description of a clock path outside the macro and description of a macro boundary path which includes a tracing, with an external terminal name included in the layout-implemented macro netlist as a starting point, the layout-implemented top netlist towards outside of the macro are clock paths related to said macro, and a timing analysis processing of analyzing a timing of said macro boundary path by using said merging-implemented macro netlist.

* * * * *